(12) United States Patent
Fasnacht

(10) Patent No.: US 10,918,241 B2
(45) Date of Patent: Feb. 16, 2021

(54) DRINKS PREPARATION MACHINE AND A METHOD FOR OPERATING A DRINKS PREPARATION MACHINE

(71) Applicant: JURA Elektroapparate AG, Niederbuchsiten (CH)

(72) Inventor: Lukas Fasnacht, Olten (CH)

(73) Assignee: JURA ELEKTROAPPARATE AG, Niederbuchsiten (CH)

( * ) Notice: Subject to any disclaimer, the term of this patent is extended or adjusted under 35 U.S.C. 154(b) by 485 days.

(21) Appl. No.: 15/101,666

(22) PCT Filed: Dec. 5, 2014

(86) PCT No.: PCT/EP2014/003257
§ 371 (c)(1),
(2) Date: Jun. 3, 2016

(87) PCT Pub. No.: WO2015/082079
PCT Pub. Date: Jun. 11, 2015

(65) Prior Publication Data
US 2016/0302614 A1    Oct. 20, 2016

(30) Foreign Application Priority Data
Dec. 6, 2013 (EP) ..................................... 13405134

(51) Int. Cl.
*A47J 31/60* (2006.01)
*A47J 31/58* (2006.01)
*A47J 31/06* (2006.01)

(52) U.S. Cl.
CPC ............. *A47J 31/605* (2013.01); *A47J 31/06* (2013.01); *A47J 31/58* (2013.01)

(58) Field of Classification Search
CPC .......... A47J 31/06; A47J 31/58; A47J 31/605; A47J 31/002; A47J 31/20; A47J 31/4457;
(Continued)

(56) References Cited

U.S. PATENT DOCUMENTS 5,267,507 A * 12/1993 Enomoto ................. A47J 31/42
241/101.2
5,287,795 A * 2/1994 Enomoto ................. A47J 31/42
241/101.2
(Continued)

FOREIGN PATENT DOCUMENTS

DE    10 2008 052 273 A1    4/2010
EP     1 010 385 A1         6/2000
(Continued)

OTHER PUBLICATIONS

Human Translation of Meuer DE 102008052273. Published Apr. 22, 2010. (Year: 2010).*
(Continued)

*Primary Examiner* — Dana Ross
*Assistant Examiner* — Joseph W Iskra
(74) *Attorney, Agent, or Firm* — Collard & Roe, P.C.

(57) ABSTRACT

A drinks preparation machine for preparing a drink can be operated in multiple operational modes and includes a liquid container, a drinks preparation device for preparing the drink using a liquid, at least one fluid line which is connected to the liquid container and drinks preparation device, a receiving device for receiving a liquid filter in a predetermined filter position, a sensor for detecting a liquid filter, and a control device which controls a supply of a liquid from the liquid container into the fluid line. The control device is designed to prompt a liquid to be supplied into the at least one fluid line as a function of the signal of the sensor. In at least one of the operational modes, the liquid supply can be prompted independently of whether a liquid filter is placed in the predetermined filter position, and in at least one other of the operational modes, the liquid supply cannot be prompted when a liquid filter is placed in the predetermined filter position.

12 Claims, 3 Drawing Sheets

(58) Field of Classification Search
CPC ...... A47J 31/4489; A47J 31/46; A47J 31/462;
A47J 31/4482; A23F 5/262; G01F 23/292
USPC .......................................... 99/280, 282, 285
See application file for complete search history.

(56) References Cited

U.S. PATENT DOCUMENTS

| | | | | |
|---|---|---|---|---|
| 6,298,768 | B1* | 10/2001 | Fukushima | ........... A47J 31/408 |
| | | | | 99/279 |
| 2003/0084047 | A1* | 5/2003 | Williamson | ........... G06Q 10/10 |

FOREIGN PATENT DOCUMENTS

| EP | 2 082 670 A1 | 7/2009 |
|---|---|---|
| GB | 2 325 179 A | 11/1998 |

OTHER PUBLICATIONS

International Search Report of PCT/EP2014/003257, dated Apr. 8, 2015.

* cited by examiner

DRINKS PREPARATION MACHINE AND A METHOD FOR OPERATING A DRINKS PREPARATION MACHINE

CROSS REFERENCE TO RELATED APPLICATIONS

This application is the National Stage of PCT/EP2014/003257 filed on Dec. 5, 2014, which claims priority under 35 U.S.C. § 119 of European Application No. 13405134.1 filed on Dec. 6, 2013, the disclosure of which is incorporated by reference. The international application under PCT article 21(2) was not published in English.

The invention relates to a drinks preparation machine for preparing a drink and a method for operating a drinks preparation machine.

Drinks preparation machines which are able to prepare and dispense a drink by using a liquid are known. In this case, depending on the type of drink, it may be provided for the preparation of the drink to bring a portion of a liquid (for example water) and a predetermined quantity of a flavoured substance (for example coffee, tea, or the like) to interact with one another for a specific time, so that the respective flavoured substance or parts of the substance (for example flavourings contained in the substance) are mixed with the liquid or dissolved in the liquid and in this manner form a consumable drink. This type of preparation is generally used when the flavoured substance is able to be stored for a long period of time, but the drink prepared from the liquid and the flavoured substance rapidly changes immediately after preparation in an undesirable or unacceptable manner (for example with regard to the taste, consistency or temperature thereof).

Such drink preparation machines, therefore, are generally designed such that they prepare a drink freshly in each case for a current requirement, generally immediately after a command to be provided by a user. To this end, such drink preparation machines frequently comprise a drinks preparation device for preparing the drink by means of a liquid, a liquid container for a liquid and a fluid system which permits the supply of liquid from the liquid container to the drinks preparation device, so that the drinks preparation device is able to prepare a drink using a liquid provided in the liquid container (for example water). The fluid system of the drinks preparation machines is accordingly able to comprise at least one fluid line which is connected to the liquid container and the drinks preparation device and thus permits the supply of a liquid from the liquid container to the drinks preparation device through the at least one fluid line.

Drinks preparation machines of the aforementioned type (for example coffee machines, in particular automatic coffee machines) are generally designed such that they are able to fulfil many different requirements: for example they are intended to be able to be operated in a simple manner by a user; they are also intended to be able to fulfil the requirements of many different users who generally have different needs regarding the operation of a drinks preparation machine and/or the preparation, of a drink and/or the taste of the drinks to be prepared.

In order to permit simple operation, drinks preparation machines of the aforementioned type are provided with a control device which is intended to ensure an operation of the respective drinks preparation machine which runs substantially automatically and only requires a few manual operations by a user. Moreover, in order to be able to fulfil the many different requirements and wishes of different users, such drinks preparation machines are generally designed such that they may be operated in many different operating modes, which generally may be activated independently of one another, for example spontaneously prompted by a user or automatically prompted by the control device of the drinks preparation machine (for example, if during the operation of the drinks preparation machine specific events occur to which the control device is intended to react in a predetermined manner, for example by activating a specific operating mode). Naturally, the operating modes in this case generally comprise at least one operating mode for preparing a drink. It is even commonplace that all of the operating modes of a drinks preparation machine comprise a plurality of operating modes which may serve for preparing a plurality of different drinks.

A drinks preparation machine of the aforementioned type may be designed, for example, as a coffee machine which is able to brew coffee in many different ways in a drinks preparation device of the drinks preparation machine using a liquid and in this manner produce different coffee drinks. In this case, the drinks preparation device may be designed as a brewing unit in which coffee is able to be brewed with hot water, and the preparation of different coffee drinks are organised in the respective different operating modes. For preparing the coffee drinks, water is able to be provided in the liquid container of the drinks preparation machine and supplied via the fluid system to the drinks preparation device (brewing unit). In order to be able to provide hot water at a suitable temperature for brewing coffee, the fluid system may be provided, for example, with a heating device which heats water, when supplied from the liquid container to the drinks preparation device, to a temperature which is sufficiently high in order to permit the brewing of coffee in the drinks preparation device.

In order to permit an operation which is user-friendly and as trouble-free as possible over a long period of time and a preparation of a large number of portions of a drink having a quality which is as uniform as possible, drinks preparation machines of the aforementioned type are generally designed such that specific operating modes are provided which are able to be activated under the control of the control device and provide a user with the possibility of making changes to the drinks preparation machine or carrying out maintenance operations during the operation of the drinks preparation machine. For example, the function of the fluid system may be impaired during the operation of the drinks preparation machine in that deposits of contaminants and/or limescale in the fluid lines of the fluid system continuously increase over time (depending on the degree of contamination and/or the calcium carbonate content of the respective liquids which flow through the respective fluid lines during operation of the drinks preparation machine). Excessive deposits of contaminants and/or limescale may reduce or prevent the through-flow of liquid through the fluid lines and potentially impair the operation of specific components of the fluid system, for example the operation of valves or heating devices (for example an instantaneous water heater) which may be present for heating the liquid when it flows through the fluid lines. Moreover, deposits of contaminants and/or limescale in the fluid lines of the fluid system may negatively influence the taste of the prepared drinks.

In order to reduce deposits of contaminants and/or limescale in the fluid lines of the fluid system, drinks preparation machines of the aforementioned type generally permit an activation of specific operating modes which serve for cleaning and/or descaling the fluid system. For example, it is possible for an operating mode for cleaning the fluid system to be able to be activated in which, under the control of the control device of the drinks preparation machine, a cleaning liquid may be introduced from the liquid container into the fluid system in order to remove contaminants from the respective fluid lines of the fluid system or at least specific sections of these fluid lines. Accordingly, for example, it is possible for an operating mode to be able to be activated for descaling the fluid system in which, under the control of the control device of the drinks preparation machine, a descaling liquid may be introduced from the liquid container into the fluid system in order to remove limescale deposits from the respective fluid lines of the fluid system or at least specific sections of these fluid lines.

In drinks preparation machines of the aforementioned type, there is often the possibility of filtering the liquid which is provided in the liquid container by means of a liquid filter, before it enters into the respective fluid lines of the fluid system, in order to reduce the quantity of contaminants and/or lime-scale of the liquid flowing through the respective fluid lines. A drinks preparation machine, therefore, generally has a receiving device for receiving a liquid filter which is able to be positioned in a predetermined filter position and removed again therefrom, wherein the receiving device is configured such that independently of whether a liquid filter is placed in the predetermined filter position, a supply of a liquid from the liquid container to the drinks preparation device is possible through the at least one fluid line, and such that, if a liquid filter is placed in the predetermined filter position, with the supply of a liquid from the liquid container into the at least one fluid line, at least one portion of the liquid has to pass through the liquid filter. The use of a liquid filter in this case is optional and is in the discretion of the respective users. If, for the preparation of drinks, for example, clean water with a low calcium carbonate content can be provided as the liquid in the liquid container, it might be possible simply to dispense with providing the receiving device with a liquid filter, in particular as the use of a liquid filter in this case would have no effect or only a small effect on the quality of the water used.

However, if only water with, a high calcium, carbonate content or water containing contaminants is available as the liquid for the preparation of drinks, it may be useful to provide the receiving device with a liquid filter. The use of liquid filters in this case would have the advantage that descaling and/or cleaning of the respective fluid lines would only have to be carried out infrequently. This has the drawback that after a certain time period, a used liquid filter would preferably have to be replaced by an unused filter, in particular since a liquid filter degrades in use and its filtering action is impaired over time, so that ultimately a complete depletion of the filtering action may occur. If a used liquid filter is not replaced in good time by a further (unused) liquid filter, this would have the disadvantageous effect that contaminants and/or calcification of the respective fluid lines would not be ultimately prevented in spite of the use of the liquid filter. In this case, accordingly, after a certain period of time it might nevertheless be necessary to undertake descaling and/or cleaning of the respective fluid lines, i.e. the aforementioned operating mode for descaling the fluid system and/or the aforementioned operating mode for cleaning the fluid system would have to be activated, and accordingly a descaling liquid and/or cleaning liquid would have to be provided in the liquid container.

In drinks preparation machines of the aforementioned type generally it is left to the user, during the operation of a drinks preparation machine—generally by means of corresponding manual operations of the user—to ensure for the provision of the respectively required liquid in the liquid container, for positioning a liquid filter in the predetermined filter position and for replacing a used liquid filter by an unused liquid filter. In order to ensure substantially trouble-free operation of such a drinks preparation machine, a user generally has to have detailed knowledge of the drinks preparation machine and, in particular, details of the different operating modes of the drinks preparation machine. In this case, faulty operation of the drinks preparation machine by the user is not excluded. For example, it is conceivable that a user—on the assumption that the fluid system of the drinks preparation machine is calcified or contaminated—on the one hand might wish to descale and/or clean the respective fluid lines of the fluid system and also with further operation of the drinks preparation machine to use a liquid filter to filter the liquid provided in the liquid container. In this case, the user may provide a descaling liquid or a cleaning liquid in the liquid container and activate the operating mode for descaling the respective fluid lines or the operating mode for cleaning the respective fluid lines which might have the effect that the control device might prompt a supply of the descaling liquid and/or the cleaning liquid from the liquid container into the respective fluid lines of the fluid system. In this case, should a liquid filter be placed in the predetermined filter position, at least one portion of the descaling liquid and/or the cleaning liquid which would be introduced from the liquid container into the respective fluid lines would forcibly pass through the liquid filter. This may cause significant problems.

The descaling liquid and/or the cleaning liquid, for example, may not be compatible with the liquid filter and potentially, generally unnoticed by the user, trigger undesired reactions in the liquid filter, usually with disadvantages for the further operation of the drinks preparation machine. On the one hand, the descaling liquid and/or the cleaning liquid may change or optionally destroy specific materials contained in the liquid filter. This may have the effect that, after finishing the operating mode for descaling the respective fluid lines and/or the operating mode for cleaning the respective fluid lines, during further operation of the drinks preparation machine the liquid filter is no longer able to provide the anticipated filtering action, so that the respective fluid lines calcify and/or become contaminated further without the user being aware. An additional problem may occur if the liquid filter placed in the predetermined filter position was in use for a long period of time before the activation of the operating mode for descaling the respective fluid lines and/or the operating mode for cleaning the respective fluid lines, so that large quantities of limescale and/or large quantities of contaminants may have collected in the liquid filter. In this case, when the descaling liquid and/or the cleaning liquid passes through the liquid filter, this may have the effect that large quantities of calcified material or contaminants suddenly detach from the liquid filter and are transported into the respective fluid lines, with the result that the calcified material and/or contaminants settle in the fluid lines and optionally may block the fluid lines. In this case, in particular fluid lines and/or fluid line sections in the region of valves, pumps or heating devices (for example an instantaneous water heater) which may be present for heating the liquid when flowing through the fluid lines, are at risk.

It is the object of the invention to avoid the aforementioned drawbacks and to provide a drinks preparation machine which provides the use of a liquid filter and helps to avoid faulty operation of the drinks preparation machine by a user with regard to the use of a liquid filter. Moreover, a corresponding method for operating a drinks preparation machine is intended to be provided.

This object is achieved according to the invention by a drinks preparation machine having the features of claim 1 and a method having the features of claim 8.

The drinks preparation machine for preparing a drink is able to be operated in multiple operating modes and comprises: a liquid container for a liquid; a drinks preparation device for preparing the drink using a liquid; at least one fluid line which is connected to the liquid container and the drinks preparation device in order to permit a supply of a liquid from the liquid container to the drinks preparation device through the at least one fluid line; a receiving device for receiving a liquid filter which is able to be placed in a predetermined filter position and removed again therefrom; a sensor for detecting a liquid filter and a control device for controlling a supply of a liquid from the liquid container into the at least one fluid line. In this case, the receiving device is configured such that, independently of whether a liquid filter is placed in the predetermined filter position, a supply of a liquid from the liquid container to the drinks preparation device is possible through the at least one fluid line, and such that if a liquid filter is placed in the predetermined filter position, with a supply of a liquid from the liquid container into the at least one fluid line, at least one portion of the liquid has to pass through the liquid filter. Moreover, the sensor is configured to produce a signal which contains information about whether a liquid filter is placed in the predetermined filter position.

According to the invention, the control device, for example a microprocessor, is designed to prompt the supply of a liquid from the liquid container into the at least one fluid line as a function of the signal of the sensor, wherein the control device is configured such that in at least one of the operating modes it prompts the supply of a liquid independently of whether a liquid filter is placed in the predetermined filter position, and in at least one other of the operating modes, it prompts the supply of a liquid exclusively when no liquid filter is placed in the predetermined filter position.

The drinks preparation machine according to the invention has the advantage that, with the assistance of the control device, specific faulty operations of the drinks preparation machine by a user may be very reliably avoided. In this case, it is relevant that using signal from the sensor the control device is able to determine automatically whether a liquid filter is present or not.

Those operating modes in which the supply of a liquid from the liquid container is able to be prompted in the respective fluid lines independently of whether a liquid filter is placed in the predetermined filter position, in this case are intended for operations of the drinks preparation machine in which it is ensured or in which it may be very reliably assumed that a user would provide a liquid in the liquid container which is compatible with the use of a liquid filter. An activation of one of these operating modes is, therefore, in principle unproblematical with regard to the use of a liquid filter, independently of whether a liquid filter is placed in the predetermined filter position or not. This is generally the case for those operating modes which serve for preparing a drink, so that it may be assumed that a user would generally provide water as the liquid (i.e. a liquid which would, without fail, be compatible with the use of a liquid filter).

However, those operating modes in which the supply of a liquid from the liquid container into the respective fluid lines is not able to be prompted when a liquid filter is placed in the predetermined filter position, are usually intended for such operating modes of the drinks preparation machine in which it may be assumed that a user could provide or would highly likely provide in the liquid container a liquid which is not compatible with the use of a liquid filter. This relates, in particular, to operating modes which are associated with descaling or cleaning of the respective fluid lines. An activation of such operating modes might be problematical, in principle, if a liquid filter were placed in the predetermined filter position. The control device of the drinks preparation machine according to the invention, therefore, prevents as a precaution a supply of liquid from the liquid container into the respective fluid lines if a liquid filter is placed in the predetermined filter position. In this manner, during operation of the drinks preparation machine it may be substantially eliminated that a liquid filter comes into contact with a liquid which is not compatible with the liquid filter, and namely even when a user provides a descaling liquid and/or cleaning liquid in the liquid container by accident or mistake and arranges an activation of an operating mode for descaling or cleaning the respective fluid lines. A supply of fluid from the liquid container to the respective fluid lines would never be permitted by the control device in this case. This occurs automatically, in particular since the presence of a liquid filter is monitored by the sensor and the control unit is able to evaluate the signal from the sensor.

Accordingly, the object of the invention is also achieved by a method for operating a drinks preparation machine for preparing a drink of the aforementioned type, which comprises the following steps:

activating one of the operating modes of the drinks preparation machine, wherein the operating modes comprise at least one operating mode for preparing a drink and one operating mode for cleaning or descaling the at least one fluid line, evaluating a signal of the sensor by means of the control device, wherein the control device determines whether a liquid filter is placed in the predetermined filter position and controls a supply of a liquid from the liquid container into the at least one fluid line.

According to the invention, this method additionally comprises the step that the control device in the event that the operating mode for preparing a drink is activated, prompts the supply of a liquid from the liquid container into the at least one fluid line independently of whether a liquid filter is placed in the predetermined filter position, and in the event that the operating mode for cleaning or descaling the at least one fluid line is activated, prompts the supply of a liquid from the liquid container into the at least one fluid line exclusively when no liquid filter is placed in the predetermined filter position.

Further details of the invention and, in particular, exemplary embodiments of the device according to the invention and the method according to the invention are described hereinafter with reference to the accompanying drawings, in which.

Figure 1:
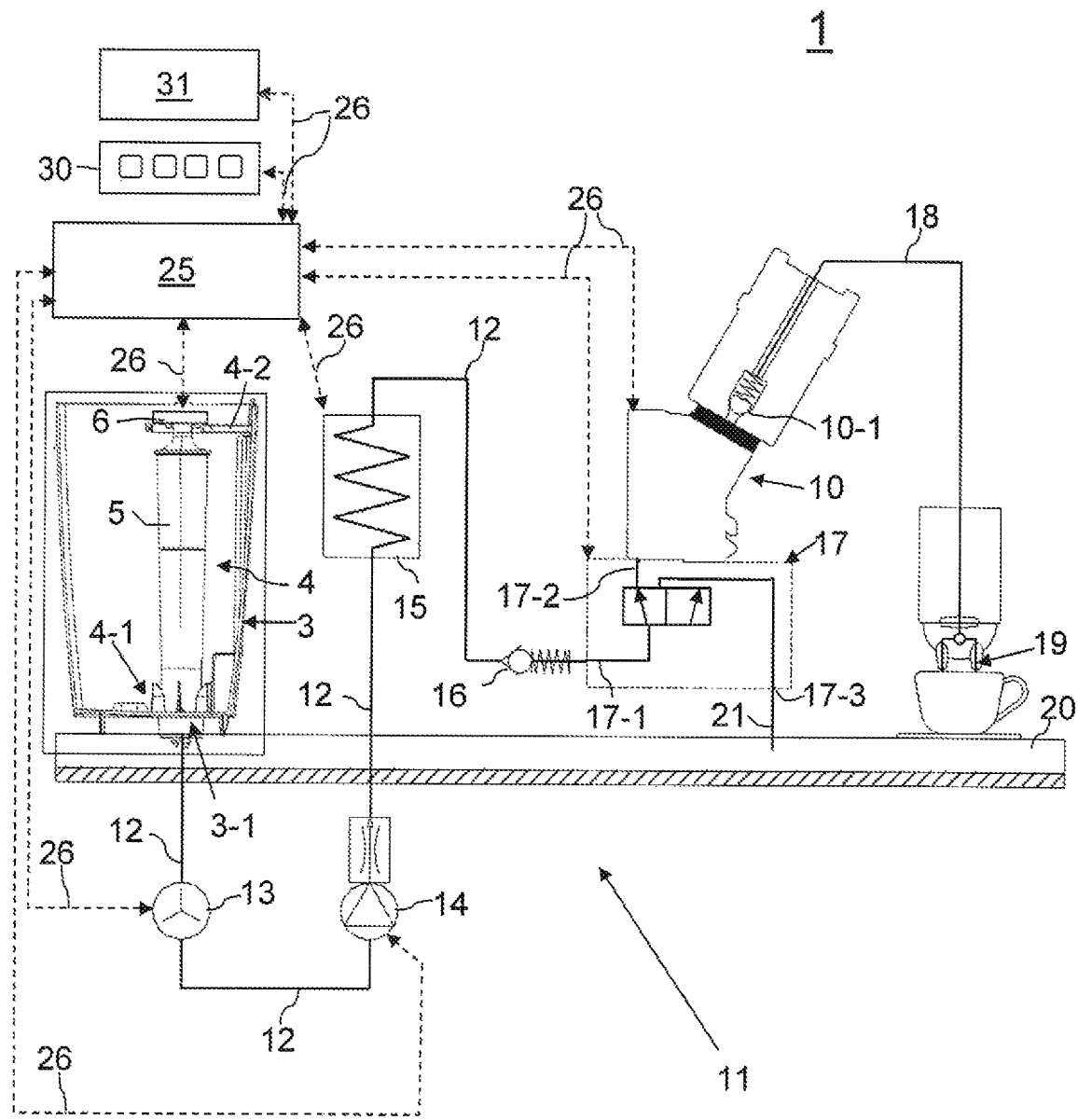
FIG. 1 shows a schematic view of a drinks preparation machine according to the invention, comprising a receiving device for receiving a liquid filter, wherein a liquid filter is positioned in a predetermined filter position.
Figure 2:
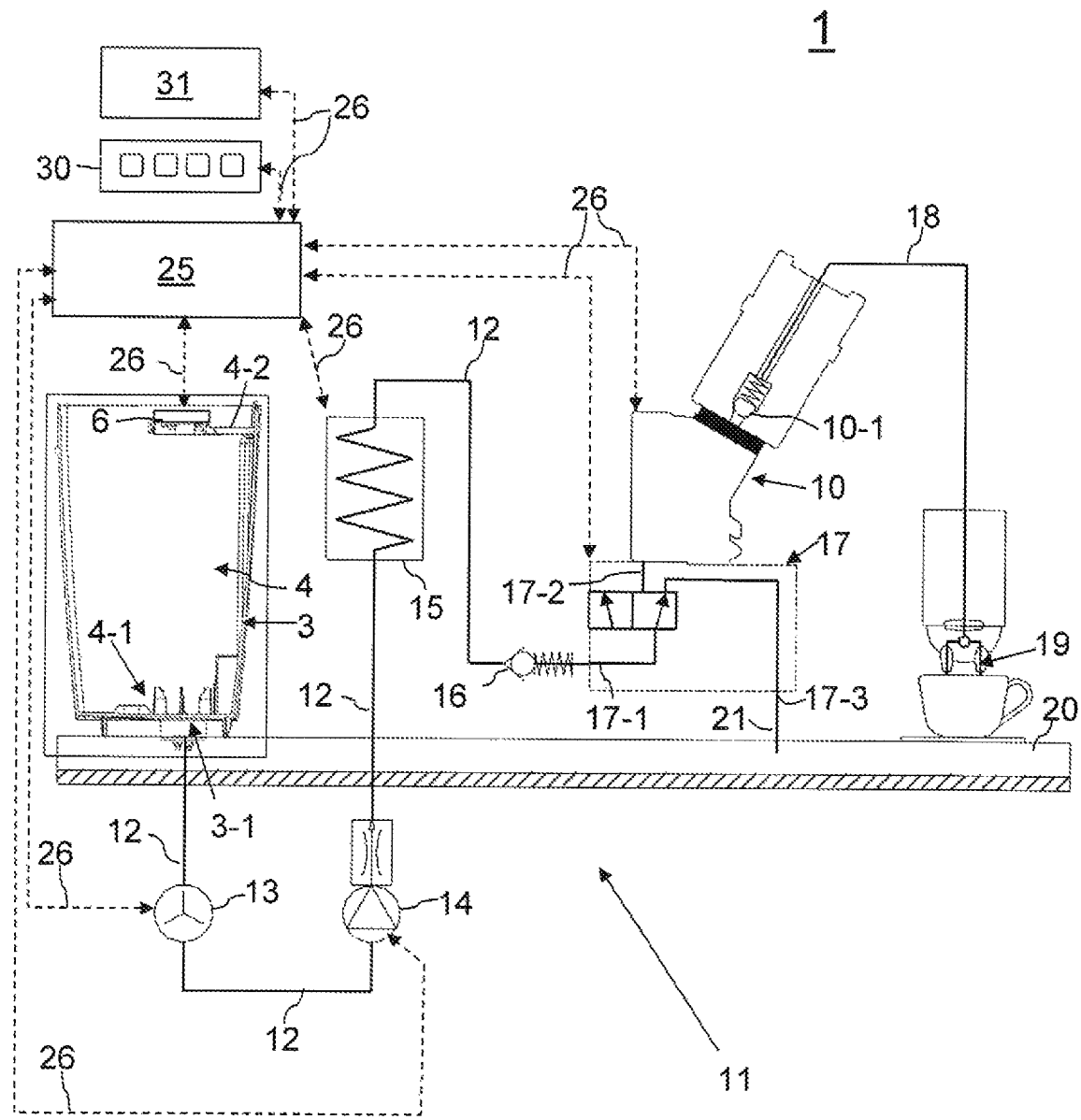
FIG. 2 shows the drinks preparation machine according to FIG. 1, wherein no liquid filter is placed in the predetermined filter position.

FIGS. 1 and 2 show a drinks preparation machine 1 according to the invention for preparing a drink. The drinks preparation machine 1 may be configured—as shown in FIGS. 1 and 2 as a possible example—as a coffee machine (automatic coffee machine) for preparing coffee drinks. Naturally, the drinks preparation machine 1 may also be designed to prepare one or more other drinks additionally or alternatively to coffee drinks.

The drinks preparation machine 1 comprises a liquid container 3 which is configured for receiving and/or providing a liquid, a drinks preparation device 10 for preparing a drink by means of a liquid and a fluid system 11 which permits a supply of the drinks preparation device 10 with a liquid provided in the liquid container 3. Accordingly, the fluid system comprises at least one fluid line 12 which is connected to the liquid container 3 and the drinks preparation device 10 in order to permit a supply of a liquid from the liquid container 3 to the drinks preparation device through the at least one fluid line 12.

The drinks preparation device 10 is configured, in the examples shown in FIGS. 1 and 2, as a brewing device which has a brewing chamber (not shown, in FIGS. 1 and 2), in which for example coffee may be brewed using a hot liquid.

The liquid container 3 comprises an outlet 3-1 for the liquid, respectively provided in the liquid container 3. In this case, one end of the fluid line 12 is connected, to the outlet 3-1, whilst a different end of the fluid line 12 is connected via a changeover valve 17 to the drinks preparation device 10. The changeover valve 17 has three connectors 17-1, 17-2 and 17-3, via which a liquid may be supplied and/or discharged, and may be switched into a plurality of positrons in order to be able to produce different fluid connections between the connectors 17-1, 17-2 and 17-3 (depending on the respective positions). As FIGS. 1 and 2 indicate, the connector 17-1 is connected to the fluid line 12 whilst the connector 17-2 is connected to the drinks preparation device 10 and, in particular, to the aforementioned brewing chamber for brewing coffee and the connector 17-3 discharges into a discharge line 21, which has an open end positioned above a residual liquid tray 20. The discharge line 21 provides the possibility, if required, to permit residual liquid which may collect during operation of the drinks preparation machine 1 in the fluid line 12 and/or in the drinks preparation device 10, to flow out into the residual liquid tray 20.

In the view according to FIG. 1, the changeover valve 17 is switched into a first position which is configured such that a fluid connection is produced between the connectors 17-1 and 17-2. In this case, the drinks preparation device 10 is connected to the liquid container 3 such that a liquid is able to be transported from the liquid container 3 via the outlet 3-1, the fluid line 12 and the changeover valve 17 and/or the connector 17-2 of the changeover valve 17 to the drinks preparation device 10 and to be conducted into the aforementioned brewing chamber for brewing coffee.

As the view according to FIG. 2 indicates, the changeover valve 17 is able to be switched into a second position which is configured such that a fluid connection is produced between the connectors 17-1 and 17-3. In this case, the fluid line 12 is connected to the connector 17-3 of the changeover valve 17, so that a liquid is able to flow out via the connector 17-3 of the changeover valve 17 and the discharge line 21 from the fluid line 12 into the residual liquid tray 20.

Moreover, the changeover valve 17 may be constructed such that it is able to be switched at least into a further position (not shown in the figures), in which a fluid connection is produced between the connectors 17-2 and 17-3, so that optionally a residual liquid is able to flow out from the drinks preparation device 10 via the changeover valve 17 and the discharge line 21 into the residual liquid tray 20.

As FIGS. 1 and 2 further indicate, the fluid system 11 may comprise a plurality of devices which permit a liquid provided in the liquid container 3 to be supplied to the fluid line 12 through the outlet 3-1 and to be transported in the fluid line 12 and the temperature of the liquid to be regulated. To this end, integrated in the fluid line 12 are the following: a pump 14 for transporting a liquid along the fluid line 12; a flowmeter 13 for measuring a flow of a liquid through the fluid line 12 and a heating device 15 (preferably an instantaneous water heater) for heating a liquid in the fluid line 12. Moreover, the fluid system 11 may comprise a non-return valve 16 which, on the one hand, permits a transport of liquid through the fluid line 12 from the liquid container 3 to the changeover valve 17 and/or to the drinks preparation device 10 but prevents a transport of liquid in the reverse direction from the drinks preparation device 10 and/or from the changeover valve 17 to the liquid container 3.

As FIGS. 1 and 2 further indicate, the drinks preparation machine 1 comprises a receiving device 4 for receiving a liquid filter 5 in order to permit that a liquid to be supplied to the fluid line 12 is able to be filtered, in order to remove contaminants and/or to reduce the calcium carbonate content of the liquid, if required. In the present example, a liquid filter 5 to be received by the receiving device 4 has a substantially cylindrical housing. The receiving device 4 comprises a seat 4-1 for a liquid, filter 5, wherein the liquid filter 5 is able to be placed on the seat 4-1 and the seat 4-1 in the present example is configured to retain at least one end of a liquid filter 5, for example, positively. As FIGS. 1 and 2 also indicate, the receiving device 4 may additionally comprise a retaining device 4-2 which is suitable for retaining a liquid filter 5 placed on the seat 4-1 at a position remote from the seat 4-1, for example at an end remote from the seat 4-1. In this manner, the receiving device 4 is able to place a liquid filter 5 in a predetermined filter position and to retain it there in a predetermined position and, if required, to remove it again from this filter position.

In the present example, the receiving device 4 is arranged in the liquid container 3 so that the respective liquid filter 5 is also able to be placed in the liquid container 3, preferably in the vicinity of the outlet 3-1. Alternatively, the receiving device 4 may naturally also be arranged elsewhere, for example such that the liquid filter 5 is able to be placed in the outlet 3-1 or between the outlet 3-1 and a section of the fluid line 12 and is able to be removed again in each case therefrom.

Generally, the receiving device 4 is configured such that if a liquid filter 5 is placed in the predetermined filter position, with a supply of a liquid from the liquid container 3 into the at least one fluid line 12, at least one portion of the liquid has to pass through the liquid filter 5 (and may be filtered as a result). The liquid filter 5 in this case is configured such that it comprises a region filled with filter material through which the liquid passing through the liquid filter 5 has to flow in each case. The filter material may, for example, consist of absorbent materials which are suitable for absorbing aromas and flavourings contained in the liquid and/or ion exchangers which serve for removing lime scale or metals from the liquid.

As is visible, FIG. 1 shows the drinks preparation machine 1 in a situation in which a liquid filter 5 is received by the receiving device 4. In contrast, FIG. 2 shows the drinks preparation machine 1 in a situation in which no liquid filter 5 is received by the receiving device 4, so that in this case a liquid provided in the liquid container 3 may be directly supplied to the fluid line 12 without passing through a liquid filter 5, i.e. unfiltered.

As FIGS. 1 and 2 further indicate, the drinks preparation machine 1 comprises a sensor 6 for detecting a liquid filter 5. The sensor 6 is configured to produce a signal which contains information about whether a liquid filter 5 is placed in the predetermined filter position. It should be mentioned that the sensor 6 is able to be produced by conventional means in very different ways. For example, the sensor 6 may comprise a touch-sensitive sensor element with which a liquid filter 5 may be brought forcibly into contact if the liquid filter 5 is intended to be placed in the predetermined filter position (such a sensor element, for example, may be a mechanically actuatable electrical switch, a capacitive measuring element or a force sensor). Alternatively, the sensor 6 may comprise a measuring device which is suitable for detecting a liquid filter 5 in a contact less manner, for example by optical, magnetic or electromagnetic means. It is also conceivable that each liquid filter 5 intended for use with the drinks preparation machine 1 is provided with an information carrier which contains information identifying the liquid filter 5, and the sensor 6 comprises a device which is suitable for detecting and evaluating this information identifying the liquid filter 5. The information identifying the respective liquid filter 5 may, for example, be data or markings which are readable by electronic, optical, magnetic or electromagnetic means; accordingly any structure is suitable as an information carrier which may contain such data or markings in readable form (for example electronic, magnetic or optical storage elements).

In order to permit an automatic control of an operation of the drinks preparation machine 1, the drinks preparation machine 1 is provided with a control device 25. The control device 25 has, amongst other things, the task of controlling the supply of a liquid from the liquid container 3 into the fluid line 12 and the preparation of drinks by means of the drinks preparation device 10.

As FIGS. 1 and 2 indicate, the drinks preparation device 10 comprises an outlet valve 10-1 which is configured to control the dispensing of a drink prepared by means of the drinks preparation device 10, in the present example a coffee drink. In the event that the outlet valve 10-1 is closed, there is the possibility of brewing coffee in the brewing chamber of the drinks preparation device 10 with hot water at a predetermined pressure and in this manner to prepare a coffee drink (for example an espresso). The outlet valve 10-1 is connected by means of an outlet line 18 to a drinks outlet 19 for a coffee drink, so that a coffee drink brewed in the brewing chamber of the drinks preparation device 10 may be dispensed via the drinks outlet 19, if the outlet valve 10-1 is open, for example into a drinks container positioned at the drinks outlet 19 (as indicated in FIGS. 1 and 2).

As FIGS. 1 and 2 further indicate, the control device 25 is connected via control lines 26 to a series of components of the drinks preparation machine 1, in particular to the sensor 6, the flowmeter 13, the pump 14, the heating device 15, the changeover valve 17 and the drinks preparation device 10, in order to communicate data and/or signals suitable for controlling the operation of the drinks preparation machine 1 via the control lines 26. The control device 25 is also connected to an operating element 30 which permits a user to transmit instructions for operating the drinks preparation machine 1 to the control device 25. Furthermore, a display device 31 is connected to the control device which serves to display information about a current operating state of the drinks preparation machine 1 and optionally instructions for specific operations to be undertaken by a user.

In order to permit a user-friendly operation, the drinks preparation machine 1 is able to be operated in multiple operating modes. In this case, the control device 25 according to the invention is configured to prompt the supply of a liquid from the liquid container 3 into the at least one fluid line 12, depending on the signal of the sensor 6, wherein in at least one of the operating modes the supply of a liquid is able to be prompted independently of whether a liquid filter 5 is placed in the predetermined filter position, and in at least one further operating mode the supply of a liquid is not able to be prompted if a liquid filter 5 is placed in the predetermined filter position.

For a clearer explanation of these facts—with reference to FIG. 3—an example of a method V for operating the drinks preparation machine 1 is described hereinafter. This example is based on the assumption that the operating modes of the drinks preparation machine 1 comprise the following operating modes:
  a (first) operating mode M1 for starting up the drinks preparation machine,
  a (second) operating mode M2 for preparing a drink,
  a (third) operating mode M3 for cleaning or descaling the fluid line 12,
  a (fourth) operating mode M4 for replacing a liquid filter placed in the predetermined filter position.

It should be mentioned that according to the invention it is not necessarily required that the operating modes comprise exactly the aforementioned operating modes M1-M4. It is conceivable, for example, that fewer operating modes are present. The drinks preparation machine 1 could also be compatible with the invention if only two of the aforementioned operating modes were provided, for example the operating modes M2 and M3.

With regard to the operating mode M3, it is assumed hereinafter that in the operating mode M3—for cleaning or descaling the fluid line 12—either a cleaning liquid or a descaling liquid may be introduced into the fluid line 12 from the liquid container 3, which could imply that in the operating mode M3 both a cleaning of the fluid line 12 with a cleaning liquid and a descaling of the fluid line 12 with a descaling liquid have substantially the same sequence (apart from the fact that in each case different liquids could be provided for cleaning and/or descaling). By means of the invention, it might also be acceptable if instead of an operating mode M3 for carrying out cleaning of the fluid line 12 and for carrying out descaling of the fluid line 12 different operating modes, for example operating modes denoted by M3' and M3", might be provided, which in each case run in a different manner and optionally could be controlled by the control device 25 in different ways. For the sake of completeness, therefore, it should be mentioned that for each of the aforementioned operating modes M3' and/or M3" with regard to the control of a supply of a liquid (i.e. a cleaning liquid and/or a descaling liquid) from the liquid container 3 into the fluid line 12 the same observations would be relevant which are cited hereinafter for the operating mode M3 (at least regarding the control of the supply of the respective liquids depending on the signal of the sensor 6).

The operating element 30 comprises a user interface (accessible to a user) which permits a user to select and to activate an operating mode from the operating modes M1-M4 available, so that the operation of the drinks preparation machine 1 runs according to the respectively activated operating mode. When the drinks preparation machine 1 is first started up the operating mode M1 may be activated automatically by the control device 25 (for example immediately after switching on the drinks preparation machine 1). At a later time, the operating mode M1 may be activated again by a user by means of the operating element 30 if required.

The control device 25 is configured such that in the operating mode M1 the supply of a liquid (from the liquid container 3 into the fluid line 12) is able to be prompted automatically by the control device 25 if a liquid filter 5 is placed in the predetermined filter position. As a result, it is achieved that a liquid filter 5 received by the receiving device 4 (and/or the filter materials contained in the liquid filter 5) may be automatically rinsed (i.e. without further action by a user) with a liquid (water), as soon as the sensor 6 detects a liquid filter 5 (as shown in FIG. 1). As a result, the start-up of the drinks preparation machine 1 together with a liquid filter 5 is simplified for a user.

Moreover, the control device 25 is configured such that in the operating mode M2 the supply of a liquid (from the liquid container 3 into the fluid line 12) is able to be prompted by the control device 25 independently of whether a liquid filter 5 is placed in the predetermined filter position. Thus it is achieved that in the operating mode M2—for preparing a drink—a liquid (for example water) is always transported from the liquid container 3 to the drink preparation device 10, independently of whether the liquid filter 5 is received by the receiving device 4 or not. Accordingly, in the operating mode M2, drinks may be optionally prepared with a filtered liquid or with an unfiltered liquid (depending on the personal tastes of the respective user).

Moreover, the control device 25 is configured such that in the operating mode M3 the supply of a liquid is not able to be prompted by the control device 25 if a liquid filter 5 is placed in the predetermined filter position. Accordingly, in the operating mode M3 it is only possible to conduct a cleaning liquid or a descaling liquid from the liquid container 3 into the fluid line 12 and thus to clean and/or descale the fluid line 12 if no liquid filter 5 is received by the receiving device 4. If a liquid filter 5 were to be placed in the predetermined filter position, this liquid filter 5 would be detected by the sensor 6 and the presence of the liquid filter 5 would be recorded by the control device 25. If a user in this case were to accidentally provide a cleaning liquid or a descaling liquid in the liquid container 3 and activate the specific operating mode M3 for cleaning and/or descaling the fluid line 12, the control device 25 will not prompt a supply of cleaning liquid or descaling liquid into the fluid line 12 and thus prevent the cleaning liquid and/or descaling liquid from passing through the liquid filter 5 and thus coming into contact with the filter material contained in the liquid filter 5.

Moreover, the control device 25 is configured such that in the operating mode M4, the control device 25 continuously determines by means of an evaluation of the signal of the sensor 6 whether during a first time period and during a second time period following the first time period, in each case, a liquid filter 5 is placed in the predetermined filter position and the control device 25 automatically prompts the supply of a liquid during the second time period if during the first time period no liquid filter 5 is placed in the predetermined filter position and during the second time period a liquid filter 5 is placed in the predetermined filter position. In this manner, the control device 25 is able to identify, by evaluating the signal of the sensor 6 in the first and second time periods, whether an originally present (for example used) liquid filter 5 has been removed from the predetermined filter position during the first time interval and replaced by a different (for example unused; liquid filter 5 in the second time interval. The liquid filter 5 positioned in the second time interval in the predetermined filter position is detected by the sensor 6 and the presence of the liquid filter 5 is recorded by the control device 25. Thus the control device 25 may subsequently prompt a supply of a liquid (for example water) from the liquid container 3 into the fluid line 12 and thus cause the (unused) liquid filter 5 placed in the predetermined filter position in the second time interval to be automatically rinsed by the liquid (water), without an action being required therefor by a user. As a result, a replacement of a used liquid filter 5 is simplified for a user.

Figure 3:
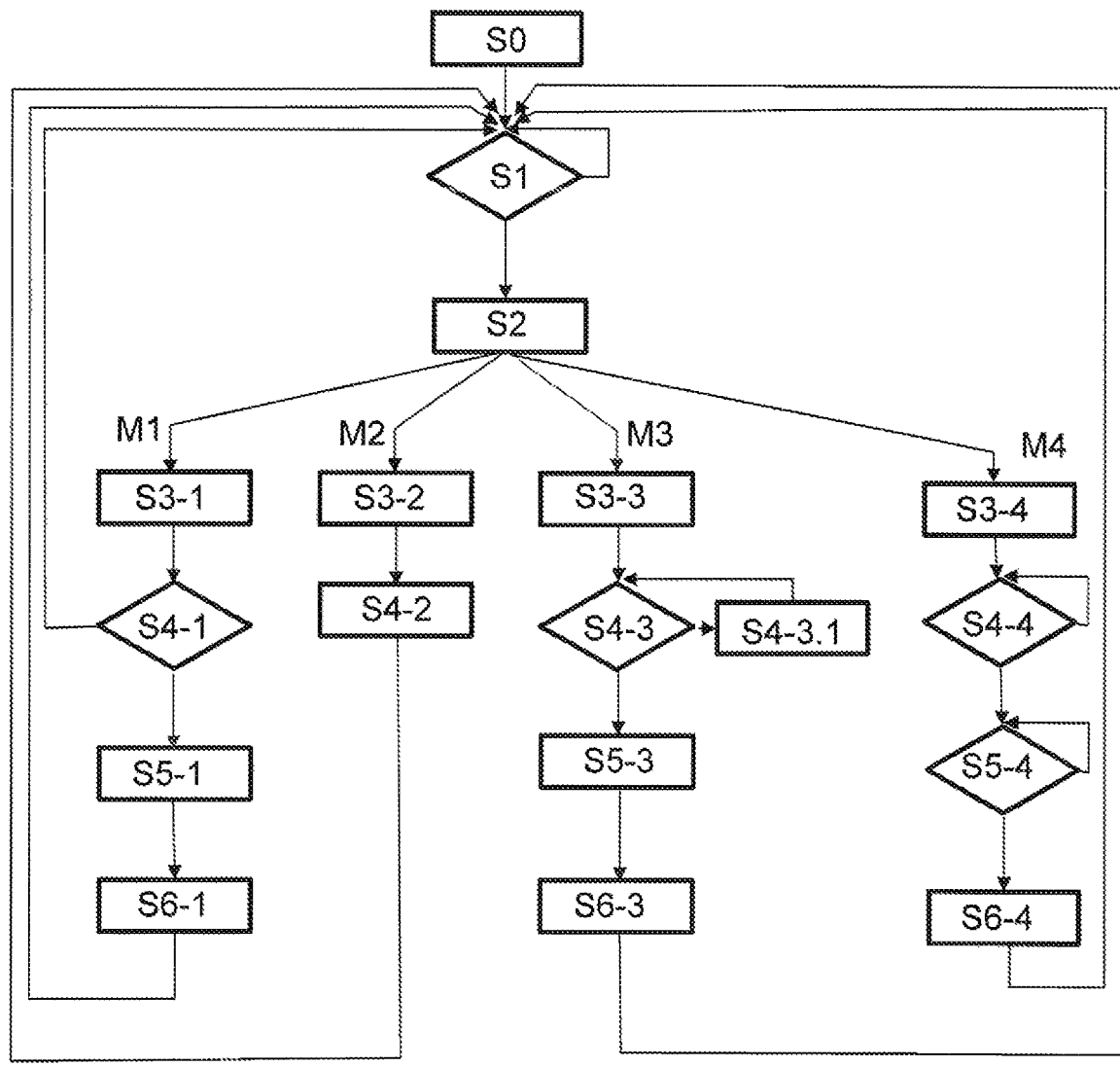
FIG. 3 shows a schematic flow diagram, of a method according to the invention.

In FIG. 3 a schematic flow diagram of the method V for operating the drinks preparation machine 1 is shown. The method V begins after switching on the drinks preparation machine 1 with a step S0 in which all components of the drinks preparation machine 1, in particular the control device 25 and the operating element 30, are set into operation-ready mode, so that the control device 25 is ready to control the subsequent operation of the drinks preparation machine 1 and, optionally by means of the operating element 30, a user of the drinks preparation machine 1 could communicate instructions to the control device 25, for example for selecting one of the operating modes M1-M4.

In a step S1 following the step S0 the control device 25 monitors whether one of the operating modes has been selected. If this is not the case, the step S1 may be repeated. If a user has selected one of the operating modes M1-M4 by means of the operating element 30, subsequently a step S2 is carried out in which the respectively selected operating mode is activated so that subsequently specific steps of the method V assigned to the respectively activated operating mode may be carried out. If the drinks preparation machine 1 in step S0 is in a state of a first start-up ("initial start-up") of the drinks preparation machine 1 by a user, the control device 25 automatically starts the step S2 and at the same time activates the operating mode M1.

If in step S2 the operating mode M1 is activated, subsequently at least the following steps S3-1, S4-1, S5-1 and S6-1 are carried out (FIG. 3):

in step S3-1 for a user there is the option of defining specific operating parameters of the drinks preparation machine 1 (for example a temperature of a drink to be prepared, a size of a portion of a drink to be prepared, and the like). The operating parameters to be defined are represented by means of the display device 31; values applicable to further operation for the respective operating parameters may be subsequently set by a user by means of the operating element 30.

in step 34-1 the control device 25 detects the signal of the sensor 6 and determines whether a liquid filter 5 is present in the predetermined filter position. If no liquid filter is present, the aforementioned step S1 may again follow step S4-1. If the control device 25 determines that a liquid filter 5 is present in the predetermined filter position, step S5-1 follows.

in step S5-1 the control device 25 monitors whether a liquid is provided in the liquid container 3 (by means of a measuring device suitable for this purpose, which may be of conventional type). If liquid is provided in the liquid container 3, the control device 25 (in particular by a corresponding activation of the pump 14) prompts a supply of liquid from the liquid container 3 into the fluid line 12, so that the liquid passes through the liquid filter 5 (and/or the filter material present in the liquid filter 5) and thus may effect an automatic rinsing of the liquid filter 5 by the liquid. The control device 25 further controls the changeover valve 17 such that a fluid connection is present between the connectors 17-1 and 17-3, so that the liquid from the fluid line 12 may flow via the discharge line 21 into the residual liquid tray 20. Subsequently, the changeover valve 17 is activated such that a fluid connection exists between 17-1 and 17-2.

in step S6-1 by means of the display device 31 information is displayed about whether the liquid filter 5 is ready for operation. Subsequently, the method V is continued with the aforementioned step S1.

If in step S2 the operating mode M2 is activated, subsequently at least the following steps S3-2 and S4-2 are carried out (FIG. 3):

in step S3-2 the changeover valve 17 is activated such that a fluid connection is present between the connectors 17-1 and 17-2. The control device 25 prompts (in particular by a corresponding activation of the pump 14 and the drinks preparation device 10) a supply of liquid from the liquid container 3 into the fluid line 12, so that the liquid may flow to the drinks preparation device 10 and by means of the drinks preparation device 10 a drink may be prepared. This supply of liquid is undertaken by the control device 25 unaffected by the signal of the sensor 6, i.e. prompted independently of whether a liquid filter 5 is placed in the predetermined filter position or not.

in step S4-2 a dispensing takes place of a drink prepared in step S4-1, through the outlet valve 10-1 (open to this end) and the drinks outlet 19. Subsequently, the method V is continued with the aforementioned step S1.

If in step S2 the operating mode M3 is activated, subsequently the following steps S3-3, S4-3, S4-3.1, S5-3 and S6-3 may be carried out (FIG. 3):

in step S3-3 the control device 25 provides a user with the options of carrying out preparations for descaling or cleaning of the fluid line 12: the user, for example, has the opportunity to provide a descaling and/or cleaning liquid required for descaling and/or cleaning in the liquid container 3 or to remove a liquid filter 5 which potentially could be placed in the predetermined filter position. Subsequently, the method may be continued with the step S4-3. In this case, the method V may be configured such that the user communicates the information to the control device 25 by means of the operating element 30 that the aforementioned preparations for the descaling and/or cleaning are terminated from the perspective of the user. Subsequently the implementation of step S4-3 is carried out.

in step S4-3 the control device 25 detects the signal of the sensor 6 and determines whether a liquid filter 5 is placed in the predetermined filter position. If the result of this determination is that no liquid filter 5 is placed in the predetermined filter position, the method V is continued with step S5-3. If the result of this determination is that a liquid filter 5 is placed in the predetermined filter position, the method V is continued with the step S5-3.1.

in step S4-3.1 no supply of liquid from the liquid container 3 into the fluid line 12 is permitted and/or prompted by the control device 25, so that no liquid is able to pass through a liquid filter 5 placed in the predetermined filter position. Subsequently (for example after a predetermined time period) the method V may be continued with the step S4-3 (as shown in FIG. 3). Alternatively for a user the possibility may be provided to terminate the operation in operating mode M3 (by a corresponding operation of the operating element 30) and to continue the method V with the step S1. Moreover, the method V may be carried out such that in step S4-3.1 by means of the display device 31 a request is communicated to a user to remove the liquid filter 5 from the predetermined filter position.

in step S5-3 the control device 25 prompts (for example by a corresponding activation of the pump 14) the supply of a predetermined quantity of a descaling or cleaning liquid provided in the liquid container 3 into the fluid line 12. In this case the changeover valve 17 may be activated such that a fluid connection is present between the connectors 17-1 and 17-3, so that the liquid supplied to the fluids line 12 is able to flow out via the discharge line 21 into the residual liquid tray 20. Alternatively, the changeover valve 17 may be activated such that a fluid connection is present between the connectors 17-1 and 17-2, so that the liquid supplied to the fluid line 12 is able to flow out via the drinks preparation device 10 and the drinks outlet 19. The latter permits a descaling and/or cleaning of the drinks preparation device 10, the outlet line 18 and the drinks outlet 19 (additionally to a descaling and/or cleaning of the fluid line 12).

in step S6-3—after the end of the descaling and/or cleaning according to step S5-3—a user is given the opportunity to remove residues of the descaling or cleaning liquid which could be present after descaling and/or cleaning, according to step S5-3, from the fluid line 12 and optionally the drinks preparation device 10, the outlet line 18 and the drinks outlet 19, by rinsing with water or a different rinsing liquid suitable for this purpose. To this end, the user may provide a suitable rinsing liquid in the container 3. After the provision of this rinsing liquid the control device 25 prompts (for example by a corresponding activation of the pump 14) a supply of a predetermined quantity of rinsing liquid present in the liquid container 3 into the fluid line 12. The rinsing liquid supplied in this manner may optionally flow out via the discharge line 21 or the drinks outlet 19 (depending on the position of the changeover valve 17). Subsequently, the method V may be continued with the step S1.

If in step S2 the operating mode M4 is activated, subsequently the following steps S3-4, S4-4, S5-4 and S6-4 may be carried out (FIG. 3):

in step S3-4 by means of the display device 31 a request may be communicated to a user to replace a liquid filter 5 placed in the predetermined filter position (i.e. being in use).

in step S4-4 the control device 25 detects the signal of the sensor 6 and determines whether in a predetermined first time period after the start of step S4-4 a liquid filter 5 is placed in the predetermined filter position. If the result of this determination is that in the first time period no liquid filter 5 is placed in the predetermined filter position, the method V is continued with step S3-4, in particular since the signal of the sensor 6 obviously displays that after carrying out the step S3-4 the liquid filter 5 which in step S3-4 has been detected by the sensor 6 in the predetermined filter position, is obviously no longer placed in the predetermined filter position and thus has been removed. If the result of the aforementioned determination is that in the first time period a liquid filter 5 is placed in the predetermined filter position, step S4-4 is repeated once or repeatedly (until the determination leads to the result that no liquid filter 5 is placed in the predetermined filter position so that the method V—as mentioned above—may be continued with step S5-4).

in step S5-4 the control device 25 detects the signal of the sensor 6 and determines whether in a predetermined second time period after the start of the step S5-4 a liquid filter 5 is positioned in the predetermined filter position. If the result of this determination is that in the second time period a liquid filter 5 is placed in the predetermined filter position, the method V is continued with step S6-4. If the result of the determination is that in the second time period no liquid filter 5 is placed in the predetermined filter position, step S5-4 is repeated once or repeatedly (until the determination leads to the result that a liquid filter 5 is placed in the predetermined filter position so that the method V—as mentioned above—may be continued with step S6-4).

in step S6-4 the control device 25 monitors whether a liquid is provided in the liquid container 3. If liquid is provided in the liquid container 3, the control device 25 prompts (by a corresponding activation of the pump 14) a supply of liquid from the liquid container 3 into the fluid line 12 so that the liquid passes through the liquid filter 5 and thus an automatic rinsing of the liquid filter 5 may be carried out by the liquid. The control device 25 further controls the changeover valve 17 such that a fluid connection exists between the connectors 17-1 and 17-3 so that the liquid may flow out of the fluid line 12 via the discharge line 21 into the residual liquid tray 20. Subsequently, the changeover valve 17 is activated such that a fluid connection is present between 17-1 and 17-2. Then the method V may be continued with step S1.

The invention claimed is:

1. A drinks preparation machine for preparing a drink which can be operated in multiple operating modes (M1, M2, M3, M4) and comprises:
    a liquid container for a liquid,
    a drinks preparation device for preparing the drink using a liquid,
    at least one fluid line which is connected to the liquid container and the drinks preparation device in order to permit a supply of a liquid from the liquid container to the drinks preparation device through the at least one fluid line,
    a receiving device for receiving a liquid filter which is able to be placed in a predetermined filter position and removed again therefrom,
    a sensor for detecting the liquid filter and
    a control device for controlling a supply of a liquid from the liquid container into the at least one fluid line, the control device being connected by respective control lines to the sensor and to a pump,
    wherein the receiving device is configured such that, independently of whether the liquid filter is placed in the predetermined filter position, a supply of a liquid from the liquid container to the drinks preparation device is possible through the at least one fluid line, and such that, if the liquid filter is placed in the predetermined filter position, with a supply of a liquid from the liquid container into the at least one fluid line, at least one portion of the liquid has to pass through the liquid filter, and
    wherein the sensor is configured to produce a signal which contains information about whether the liquid filter is placed in the predetermined filter position,
    wherein the control device is designed to prompt the supply of a liquid from the liquid container into the at least one fluid line as a function of the signal of the sensor by activating the pump,
    wherein the control device is further configured such that
    in at least one of the operating modes (M2), the control device prompts the supply of a liquid by activating the pump independently of whether the liquid filter is placed in the predetermined filter position, and
    in at least one other of the operating modes (M3), the control device then prompts the supply of a liquid by activating the pump exclusively when no liquid filter is placed in the predetermined filter position.

2. The drinks preparation machine according to claim 1, wherein the operating modes comprise at least two of the following operating modes a)-d):
    a) a first operating mode (M1) for the start-up of the drinks preparation machine, and/or
    b) a second operating mode (M2) for preparing a drink,
    c) a third operating mode (M3) for cleaning or descaling the at least one fluid line,
    d) a fourth operating mode (M4) for replacing the liquid filter placed in the predetermined filter position.

3. The drinks preparation machine according to claim 2, wherein the control device is configured such that in the second operating mode (M2), the supply of a liquid is able to be prompted by the control device independently of whether the liquid filter is placed in the predetermined filter position.

4. The drinks preparation machine according to claim 2, wherein
    the control device is configured such that in the third operating mode (M3), the supply of a liquid is not able to be prompted by the control device if the liquid filter is placed in the predetermined filter position.

5. The drinks preparation machine according to claim 2, wherein
    the control device is configured such that in the first operating mode (M1), the supply of a liquid is able to be prompted automatically by the control device if liquid filter is placed in the predetermined filter position in order to effect an automatic rinsing of the liquid filter by the liquid.

6. The drinks preparation machine according to claim 2, wherein
    the control device is configured such that in the fourth operating mode (M4), the control device continuously determines by means of an evaluation of the signal of the sensor whether during a first time period and during a second time period following the first time period in each case the liquid filter is placed in the predetermined filter position, and the control device automatically prompts the supply of a liquid during the second time period if during the first time period no liquid filter is placed in the predetermined filter position and during the second time period the liquid filter is placed in the predetermined filter position.

7. The drinks preparation machine according to claim 1, which has an operating element for selecting an operating mode from the multiple operating modes (M1, M2, M3, M4).

8. A method for operating a drinks preparation machine for preparing a drink,
    which drinks preparation machine is able to be operated in multiple operating modes (M1, M2, M3, M4) and comprises:

a liquid container for a liquid, a drinks preparation device for preparing the drink using a liquid, at least one fluid line connected to the liquid container and the drinks preparation device in order to permit a supply of a liquid from the liquid container to the drinks preparation device through the at least one fluid line, a receiving device for receiving a liquid filter which is able to be placed in a predetermined filter position and removed again therefrom, a sensor for detecting a liquid filter and a control device for controlling a supply of a liquid from the liquid container into the at least one fluid line, the control device being connected by respective control lines to the sensor and to a pump, wherein the receiving device is configured such that independently of whether a liquid filter is placed in the predetermined filter position, a supply of a liquid from the liquid container to the drinks preparation device is possible through the at least one fluid line and such that, if the liquid filter is placed in the predetermined filter position, with a supply of a liquid from the liquid container into the at least one fluid line, at least one portion of the liquid has to pass through the liquid filter, and wherein the sensor is configured to produce a signal which contains information about whether the liquid filter is placed in the predetermined filter position, which method comprises the following steps:

activating (S2) one of the operating modes (M1, M2, M3, M4) of the drinks preparation machine, wherein the operating modes comprise at least one operating mode (M2) for preparing a drink and one operating mode (M3) for cleaning or descaling the at least one fluid line, evaluating (S4-1, S4-3, S4-4, S5-4) a signal of the sensor with the control device, wherein the control device determines whether the liquid filter is placed in the predetermined filter position and controls a supply of a liquid from the liquid container into the at least one fluid line, wherein the control device in the event that the operating mode (M2) for preparing a drink is activated, prompts the supply of a liquid from the liquid container into the at least one fluid line by activating the pump independently of whether the liquid filter is placed in the predetermined filter position and in the event that the operating mode (M3) for cleaning or descaling the at least one fluid line is activated, prompts the supply of a liquid from the liquid container into the at least one fluid line by activating the pump exclusively when no liquid filter is placed in the predetermined filter position.

9. The method according to claim 8, wherein the operating modes (M1, M2, M3, M4) comprise an operating mode (M1) for the start-up of the drinks preparation machine and the control device, after an activation of the operating mode (M1) for the start-up of the drinks preparation machine, by evaluating the signal of the sensor determines whether the liquid filter is placed in the predetermined filter position and prompts a supply of a liquid from the liquid container into the at least one fluid line, provided the evaluation of the signal of the sensor results that the liquid filter is placed in the predetermined filter position.

10. The method according to claim 8, wherein the operating modes (M1, M2, M3, M4) comprise an operating mode (M4) for replacing the liquid filter placed in the predetermined filter position and the control device, after an activation of the operating mode (M4) for replacing one of the liquid filters placed in the predetermined filter position, by evaluating the signal of the sensor determines whether during a first time period and during a second time period following the first time period in each case the liquid filter is placed in the predetermined filter position and the control device automatically prompts the supply of a liquid during the second time period if during the first time period no liquid filter is placed in the predetermined filter position and during the second time period the liquid filter is placed in the predetermined filter position.

11. The method according to claim 8, wherein in the event that the operating mode (M3) for cleaning or descaling the at least one fluid line is activated and the control device determines, by evaluating a signal of the sensor, that the liquid filter is placed in the predetermined filter position, the control device transmits to a display device information on that the liquid filter is placed in the predetermined filter position and/or no supply of liquid from the liquid container into the at least one fluid line is prompted, said information being able to be shown by the display device.

12. The method according to claim 11, wherein the control device, by evaluating a signal of the sensor during a time period, determines whether the liquid filter is still present in the predetermined filter position, and the control device prompts a supply of a liquid from the liquid container into the at least one fluid line, as soon as the evaluation of the signal results that the liquid filter is removed from the predetermined filter position.

* * * * *